June 19, 1934.  P. WILSING  1,963,638
MAGNETIC CLUTCH
Filed April 22, 1931   2 Sheets-Sheet 2
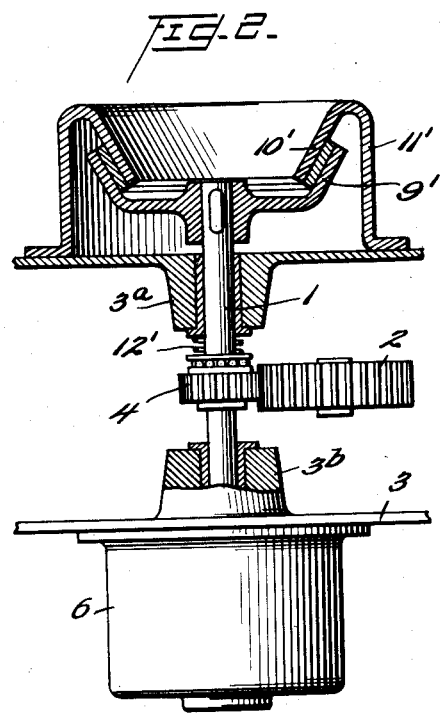
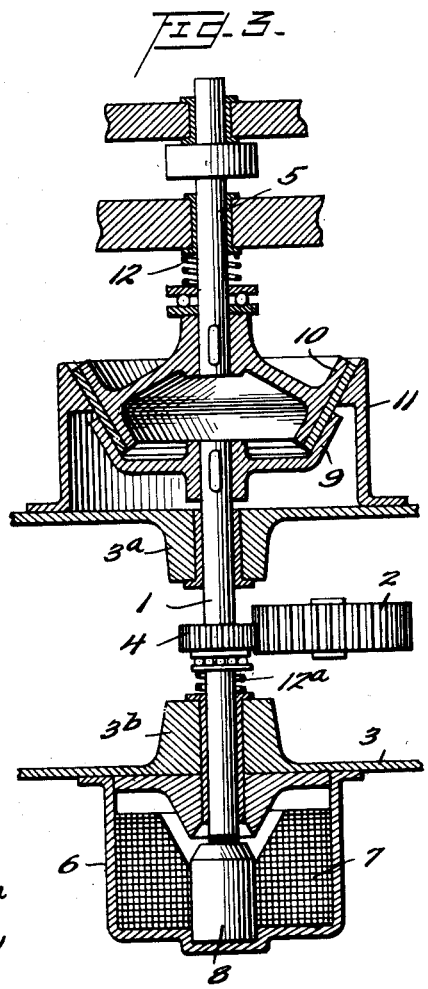
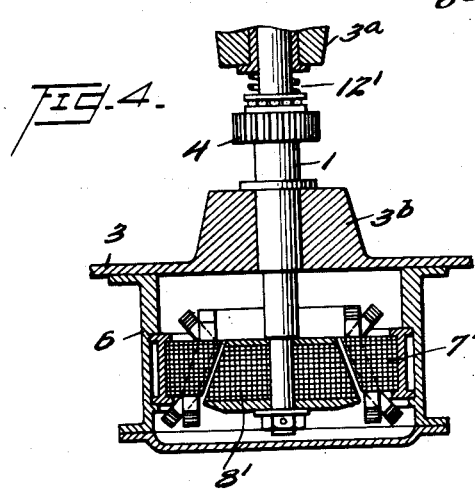
Inventor
Paul Wilsing,
By Wm. E. Evans
Attorney Patented June 19, 1934

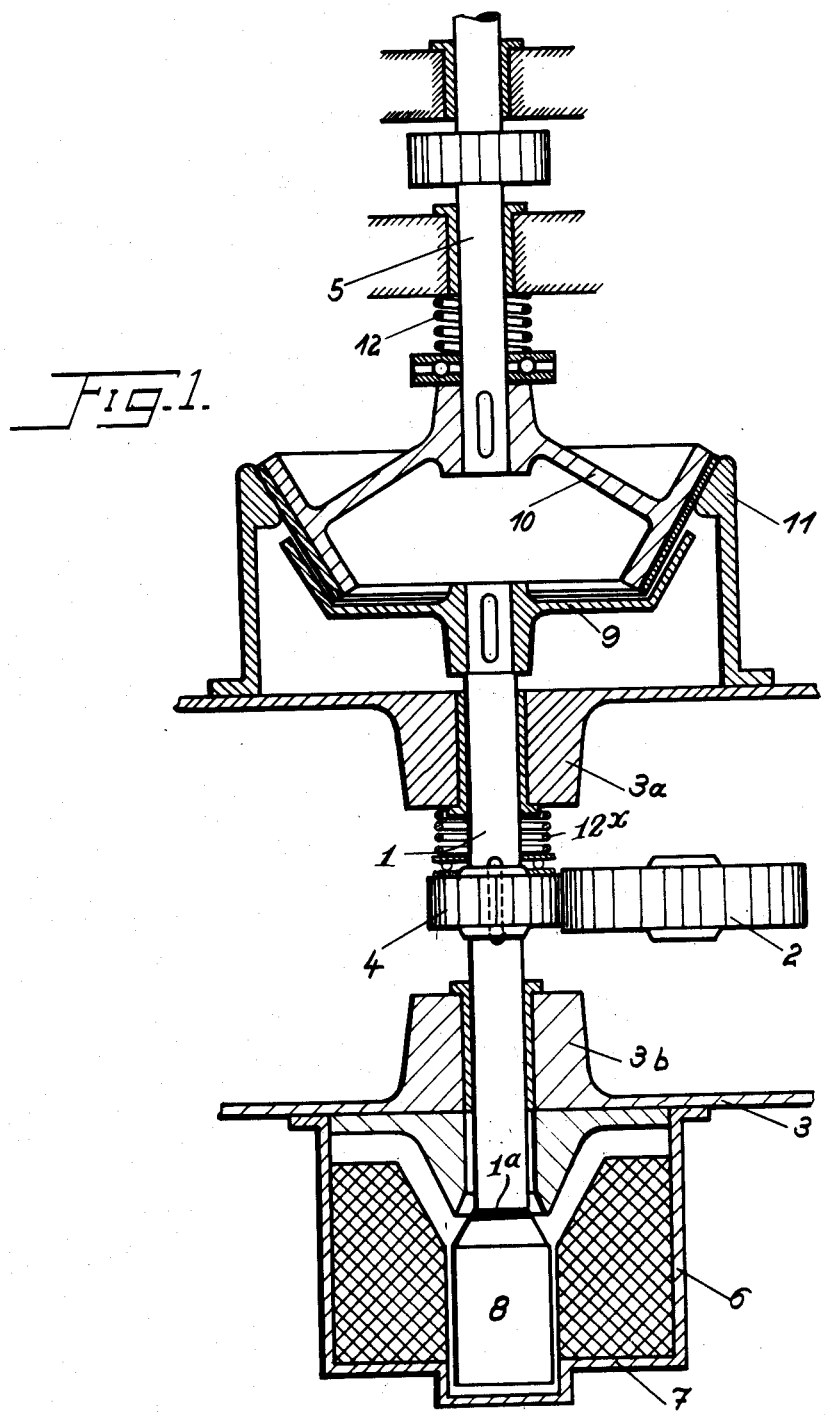

1,963,638

UNITED STATES PATENT OFFICE 1,963,638

MAGNETIC CLUTCH

Paul Wilsing, Duisburg, Germany, assignor to Demag Aktiengesellschaft, Duisburg, Germany Application April 22, 1931, Serial No. 531,973
In Germany February 26, 1930

5 Claims. (Cl. 192—84)

The invention relates to a magnetic clutch which differs considerably, in construction, from known clutches of the same type, and has the advantages of being easy to assemble, and to operate. The magnetic clutch according to the invention comprises a stationary coil, mounted centrally with respect to the clutch shaft, and a centrally disposed core adapted to rotate with the clutch shaft and to move axially, thus transmitting its axial movement to the shaft and utilizing the latter as a coupling rod. The magnet core preferably extends into the coil of the magnet.

The novel features and advantages of the invention are hereinafter set forth in the following description, and particularly pointed out in the appended claims, reference being had to the accompanying drawings, in which:

Fig. 1 is a sectional plan view showing the invention as employed as a friction coupling or brake device between two axially alined shafts.

Fig. 2 is a similar view showing a modified form of the device as constructed strictly for use as a brake.

Figs. 3 and 4 are views similar to Fig. 1 showing modifications of the type of device disclosed therein.

Referring to Fig. 1, shaft 1 is driven by the toothed wheel 2, in the gear box 3, through the pinion 4, and is mounted in the bearings 3a and 3b. The shaft 1 is to be coupled to the shaft 5, this being effected by means of the magnet 6. The winding 7 of the magnet is housed in the stationary part of the magnet casing and influences a core 8 having a conical end face, which core is disposed within the plane of the magnet coil and is directly secured to the shaft 1, but insulated therefrom by suitable insulating material 1a. The front end of the shaft 1 carries the cone clutch member or element 9, which is adapted to engage with the cone clutch member or element 10 mounted on the shaft 5, for which purpose the shaft 1 is adapted to move axially.

The core 8 is provided with a conical end face at the end which is closer to the cone clutch disk or member 9 for the reason that the conical surface of the core forms a larger surface for the passage of the magnetic lines of force than would otherwise be secured. It is to be noted also that the stationary magnet casing or housing with which the core cooperates in this connection is similarly coned. By such a construction a large number of magnetic lines of force pass from the core to the stationary part of the casing and there is thus developed a relatively large magnetic tensional force. This construction is of particular importance in view of the fact that the diameter of the core 8 requires to be maintained relatively small.

On the magnet being energized, it attracts the core 8 upward, the cone clutch member 9 being thereby brought into contact with the cone clutch member 10 and effecting the coupling. The toothed wheel 2 is of such dimensions that during this movement it remains in engagement with the pinion 4. The braking of the shaft 5 is produced by means of an outer cone 11 secured to the gear box 3. The shaft 5 is continuously pressed downward by a spring 12 whereby it at once presses against the outer cone or fixed friction element 11 when the magnet is de-energized. The shaft 1 is provided with a similar spring 12x which tends to press the shaft downward, so that the cone clutch element or member 9 moves away from the cone clutch element or member 10 when the magnet is de-energized.

Fig. 2 shows a modification of the invention in which the movement produced by the magnet 6 shifts a conical friction member or element 9' on the shaft 1 into engagement with a conical friction member or element 10' on a stationary support 11' against the resistance of a spring 12' which tends to disengage the friction member 9' from the friction member 10' when the magnet is deenergized, the device as thus constructed acting solely as a brake for the shaft 1 having the same operative advantages as the clutch construction before described. It will, therefore, be understood that the friction element on the shaft 1 may, within the scope of the invention, be employed as a clutch element for cooperation with another clutch element on a shaft to be coupled to shaft 1, as in Fig. 1, or as a friction brake element for cooperation with a suitably mounted coacting friction brake element, as in Fig. 2, for governing the speed or braking of the shaft 1 instead of coupling it to another shaft.

In Fig. 3 I have shown another modification of my invention in which a spring 12a is substituted for the spring 12', and acts to normally hold the friction element 9 pressed against the friction element 10. By this means a light friction clutching or braking engagement of the element 9 against the element 10 is normally maintained to prevent casual rotation of the shaft, which is increased for tractive effort by the action of the magnet 6 when energized.

The magnet housing 6 is mounted by means of flanges on the gear box 3, so that its heat can be effectively transmitted to the greater part of the metal of the gearing, over the whole surface of the flange.

The invention is also applicable to polyphase magnets as shown in Fig. 4; the magnet coil 7' in such case consists of an ordinary polyphase motor winding with taper bore, and conical core 8' composed of the thinnest possible insulated metal laminæ in order that the magnet core shall not transmit any torque, but only an axial force by reason of its conical form. This modification of the apparatus according to the invention may be designed as a clutch, brake or the like, and fitted to motors.

I claim:

1. An electro-magnetically operated clutch, comprising an axially movable shaft, a driving element upon said shaft for effecting its rotation, a friction member upon said shaft to one side of said driving element, a co-operating friction member into contact with which the first-named friction member is moved on axial movement of the shaft, a magnet core with a conical end face mounted fixedly upon said shaft on the other side of the driving element, and a magnet coil of fixed position surrounding said magnet core.

2. An electro-magnetically operative clutch, comprising a casing, an axially movable shaft mounted in bearings to extend across said casing, a driving element mounted upon said shaft within said casing, a clutch element upon said shaft outside said casing, a co-operating clutch member into contact with which said clutch member is moved on axial movement of the shaft, a magnet core with a conical end face mounted fixedly upon said shaft outside the casing on the opposite side to the clutch member, a magnet coil of fixed position surrounding said magnet core and a housing for said magnet coil secured to said casing by flanges.

3. An electro-magnetically operated clutch, comprising an axially movable shaft, means for rotating said shaft, a clutch element upon said shaft, a co-operating clutch member into contact with which said clutch member is moved on axial movement of the shaft, a conical magnet core mounted fixedly upon the said shaft, the said core being composed of insulated metal laminæ, and a magnet coil of fixed position comprising a polyphase motor stator surrounding said magnet core and adapted to effect axial movement of the said shaft.

4. An electro-magnetically operated clutch, comprising an axially movable shaft, a clutch member fixed upon said shaft, a co-operating clutch member into contact with which said first-named clutch member is moved on axial movement of the shaft, a conical magnet core mounted fixedly upon said shaft, and a magnet coil of fixed position relative to the core surrounding said magnet core and serving to effect axial movement of said shaft, said core being disposed within the plane of the magnet coil.

5. An electro-magnetically operated friction connection, comprising an axially movable shaft, a magnet armature on said shaft and movable therewith, a magnet element producing a field to induce axial movement of the armature, a friction element upon said shaft, cooperating clutch elements one of which is in fixed relation to the shaft, the said clutch elements being engaged on axial movement of the shaft, and cooperating friction elements one of which is in fixed relation to one of the clutch elements in order that axial movement of the shaft may effect engagement of the clutch elements and disengagement of the friction elements and vice versa without a free position.

PAUL WILSING.